:::::

United States Patent
Grauer et al.

(10) Patent No.: US 9,931,897 B2
(45) Date of Patent: Apr. 3, 2018

(54) SELF-PRESSURE REGULATOR TIRE MECHANISM

(71) Applicant: BRIGHTWAY VISION LTD., Haifa (IL)

(72) Inventors: Yoav Grauer, Haifa (IL); Ofer David, Haifa (IL); Eyal Levi, Haifa (IL); Amit Haramati, Haifa (IL)

(73) Assignee: BRIGHTWAY VISION LTD., Haifa (IL)

( * ) Notice: Subject to any disclaimer, the term of this patent is extended or adjusted under 35 U.S.C. 154(b) by 108 days.

(21) Appl. No.: 14/442,425

(22) PCT Filed: Nov. 12, 2013

(86) PCT No.: PCT/IL2013/050928
§ 371 (c)(1),
(2) Date: May 13, 2015

(87) PCT Pub. No.: WO2014/076692
PCT Pub. Date: May 22, 2014

(65) Prior Publication Data
US 2016/0272016 A1    Sep. 22, 2016

Related U.S. Application Data

(60) Provisional application No. 61/726,042, filed on Nov. 14, 2012.

(51) Int. Cl.
*B60C 23/12* (2006.01)
*B60C 23/10* (2006.01)
(Continued)

(52) U.S. Cl.
CPC .............. *B60C 23/12* (2013.01); *B60C 23/10* (2013.01); *F04B 35/06* (2013.01); *F04B 37/10* (2013.01);
(Continued)

(58) Field of Classification Search
CPC ..... B60C 23/001; B60C 23/004; B60C 23/10; B60C 23/12
(Continued)

(56) References Cited

U.S. PATENT DOCUMENTS 1,179,549 A * 4/1916 Molkenbur ............. B60C 23/12
152/418
1,254,903 A     1/1918 Hall
(Continued)

FOREIGN PATENT DOCUMENTS

WO    WO 2010/141638    12/2010

OTHER PUBLICATIONS

International Search Report of PCT Application No. PCT/IL2013/050928 dated Feb. 27, 2014.

*Primary Examiner* — Jason R Bellinger
(74) *Attorney, Agent, or Firm* — Pearl Cohen Zedek Latzer Baratz LLP

(57) ABSTRACT

An apparatus for regulating air pressure level in a tire is provided. The apparatus includes a housing attached to the tire; a piston located inside the housing, coupled to the housing via a spring; a one-way valve; and locking elements located at a specified location along the housing, wherein the piston is configured to move towards a first end of the housing responsive to an imbalance between centrifugal force applied to the piston due to angular speed of the tire and force applied to it by the spring, wherein the locking elements are configured to lock the piston at the specified location whenever the tire reaches a predefined angular speed, and release the piston once the angular speed of the tire crosses a predefined threshold, so that the piston moves towards a second end of the sleeve producing an air pulse, conveyed by the one-way valve into the tire.

8 Claims, 12 Drawing Sheets

(51) Int. Cl.
  *F04B 35/06*  (2006.01)
  *F04B 37/10*  (2006.01)
  *F04B 39/12*  (2006.01)
  *F04B 53/10*  (2006.01)
  *F04B 53/14*  (2006.01)

(52) U.S. Cl.
  CPC .............. *F04B 39/12* (2013.01); *F04B 53/10* (2013.01); *F04B 53/14* (2013.01)

(58) Field of Classification Search
  USPC ................................................ 152/418–419
  See application file for complete search history.

(56) References Cited

U.S. PATENT DOCUMENTS

| | | | |
|---|---|---|---|
| 1,566,667 A | | 6/1924 | Fuller |
| 1,874,375 A | | 2/1930 | Spicer |
| 5,355,924 A | * | 10/1994 | Olney ..................... B60C 23/12 |
| | | | 152/418 |
| 5,556,489 A | | 9/1996 | Curlett |
| 2004/0025996 A1 | | 2/2004 | Akahori |

\* cited by examiner

RELEASED STATE

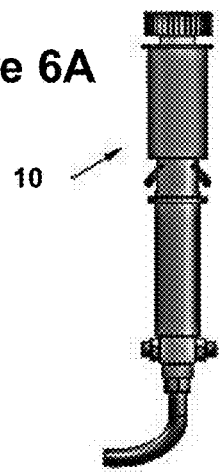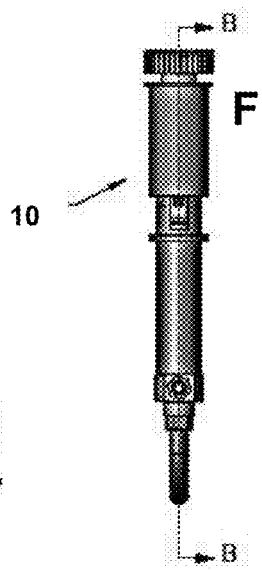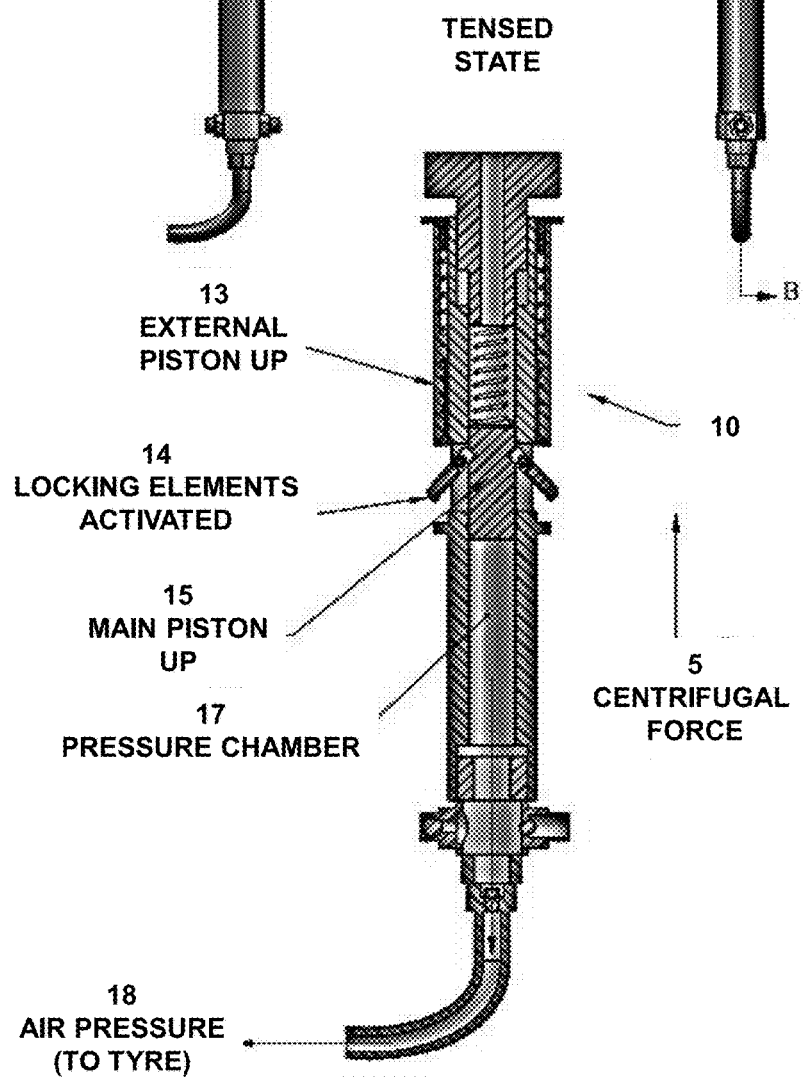
Figure 6A
Figure 6B
TENSED STATE
13 EXTERNAL PISTON UP
14 LOCKING ELEMENTS ACTIVATED
15 MAIN PISTON UP
17 PRESSURE CHAMBER
5 CENTRIFUGAL FORCE
18 AIR PRESSURE (TO TYRE)
Figure 6C Figure 11A 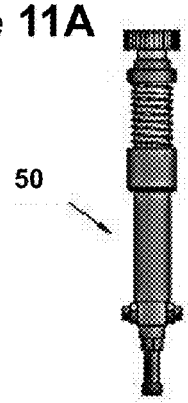 Figure 11B 
TENSED STATE
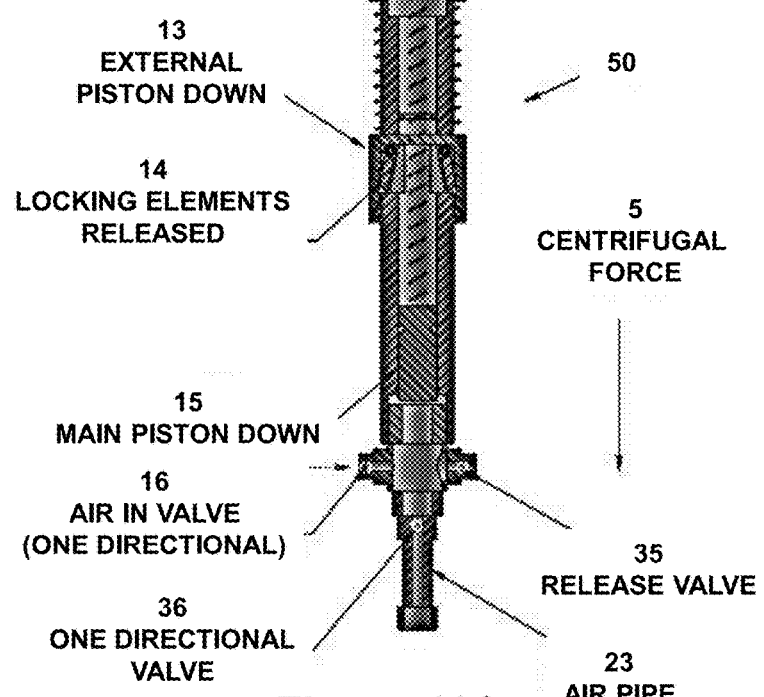
Figure 11C

Figure 12A
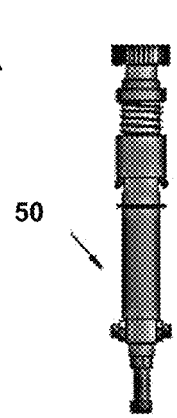
Figure 12B
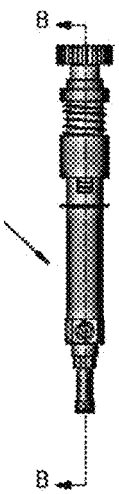
TENSED STATE
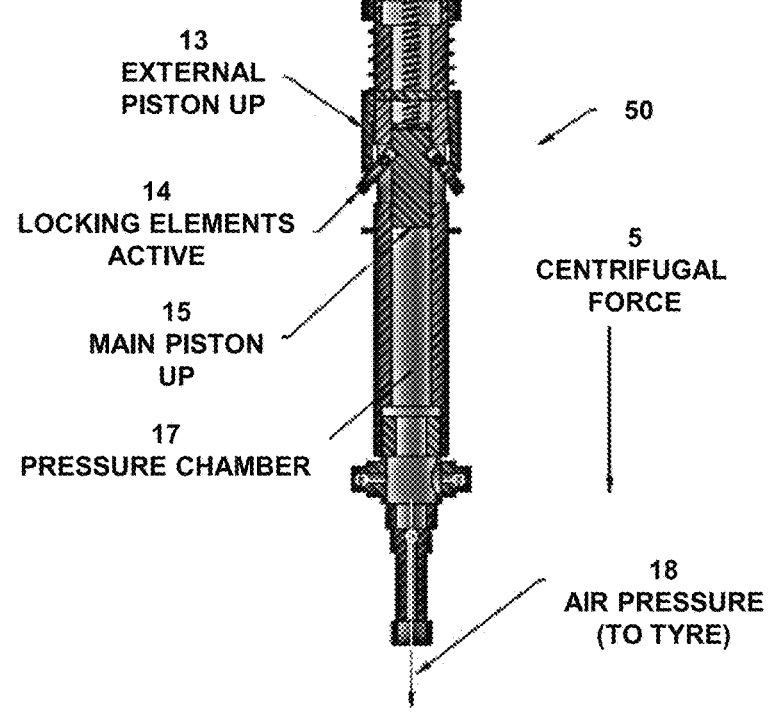
13 EXTERNAL PISTON UP
14 LOCKING ELEMENTS ACTIVE
15 MAIN PISTON UP
17 PRESSURE CHAMBER
50
5 CENTRIFUGAL FORCE
18 AIR PRESSURE (TO TYRE)
Figure 12C

SELF-PRESSURE REGULATOR TIRE MECHANISM

CROSS-REFERENCE TO RELATED APPLICATIONS

This application is a National Phase Application of PCT International Application No. PCT/IL2013/050928, International Filing Date Nov. 12, 2013, entitled "SELF-PRESSURE REGULATOR TIRE MECHANISM", published on May 22, 2014 as International Publication Number WO 2014/076692, claiming priority of U.S. Provisional Patent Application No. 61/726,042, filed Nov. 14, 2012, both of which are incorporated herein by reference in their entirety.

BACKGROUND

1. Technical Field

The present invention relates generally to a self-pressure tire regulator and, more specifically, to a mechanism incorporating solely on mechanical parts.

2. Discussion of Related Art

Air diffusion reduces tire pressure over time. The natural state of tires is under-inflated and maybe even over-inflated due to wrongfully maintenance. Accordingly, drivers must repeatedly act to maintain tire pressure or they will cause higher fuel consumption per kilometer, tire life reduction, vehicle handling lower performance and vehicle braking lower performance. Tire Pressure Monitoring Systems (TPMS) have been proposed to warn drivers when tire pressure is significantly low or high. Such systems, however, remain dependent upon the driver taking corrective action when warned to re-inflate a tire to recommended pressure.

Air temperature in a tire has a major effect on the pressure of air in the tire that must be considered in any approach to tire pressure maintenance. Ambient temperature variations and tire heating from rolling make tire temperatures and pressures denoting the amount of air in the tire. The pressure in a tire increases and decreases about 1 PSI with temperature increases and decreases of about 6° C. Normally, as a vehicle is driven the temperature in the tire increases due to the heat caused by friction from road contact and flexing of the side-walls causing a 2 to 5 PSI above its "cold" pressure (at ambient temperature). In addition, in practice tires are usually filled less often and while warm from driving. An ambient temperature drop of about 30° C., possible within a day and common within a month, reduces tire pressure by about 5 PSI. Thus, tire pressures frequently fall 8 PSI below the manufactures' requirement, typically 25%, without considering the normal leak rate of about 1 PSI per month.

Prior art presents a vast variety of self-inflating tire devices. The industry has attempted to solve the problem by offering electrical, electro-mechanical or mechanical devices, which work in association with such as U.S. Pat. No. 5,846,354, titled "tire pressure maintenance system", where a gas transfer system is described that includes; power source, a pressure sensor, a control unit, and a gas transfer mechanism. Another example to this approach may be found in U.S. Pat. No. 5,558,730, titled "vehicle wheel including self-inflating tire pump", where a pump is located inside the tire inflation region, provides a fixed tire pressure, comprised of many mechanical elements and requires a dedicated rim design.

It is desirable, therefore, to incorporate an automatic self-pressure regulator feature within the tire or as an add-on that will self-inflate the tire in order to compensate for any reduction in the tire pressure over time without a need for driver intervention. The automatic self-pressure regulator feature must also be small, simple, practical and inexpensive and that provides long term reliable operation (i.e. is fail safe such that failures do not cause deflation or over-inflation of a tire).

BRIEF SUMMARY

In accordance with the present invention, a self-pressure regulator is fixed to a wheel of a vehicle for automatically pumping air into an inflation region of a tire up to a desired pressure level.

Self-pressure regulator includes a piston which is radially outward in a cylinder by centrifugal force to thrust air from the atmosphere into the inflation region upon release.

A stopper mechanism (locking elements) prevents the piston from moving inward (e.g. wheel center) as long as the wheel rotates above a certain speed (velocity threshold).

Upon release takes place as the vehicle speed is lower than the certain speed (velocity threshold), whereas the piston is released from the stopper mechanism (locking elements).

A calibration mechanism in the self-pressure regulator provides a method of adjusting the preferred/desired pressure of the inflation region.

Self-pressure regulator feature maybe located within the rim or as an add-on.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which:

FIGS. 6A, 6B and 6C are views of a self-pressure regulator tire mechanism in a tensed state in accordance with some embodiments of the present invention;

FIGS. 11A, 11B and 11C are views of an invert self-pressure regulator tire mechanism in a released state in accordance with some embodiments of the present invention;

FIGS. 12A, 12B and 12C are views of an invert self-pressure regulator tire mechanism in a tensed state in accordance with some embodiments of the present invention.

DETAILED DESCRIPTION

Figure 1:
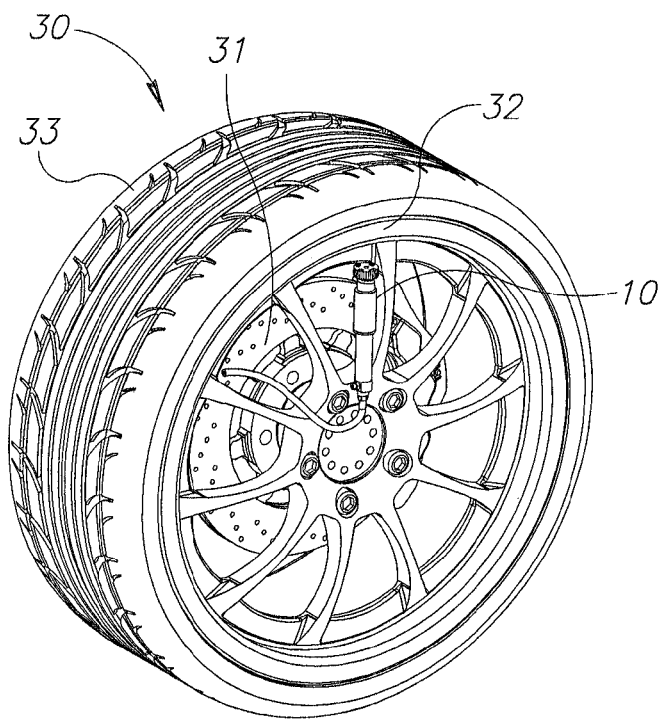
FIG. 1 is a view of a self-pressure regulator tire mechanism and a tire in accordance with some embodiments of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2:
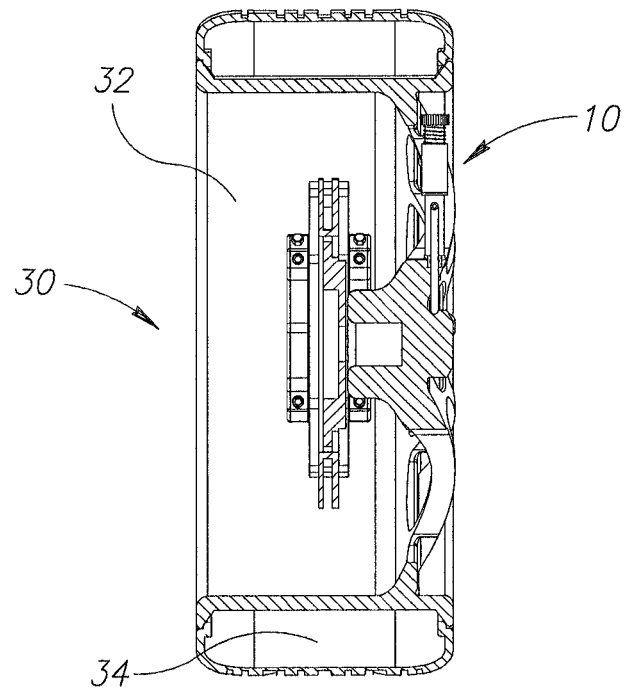
FIG. 2 is a view of a self-pressure regulator tire mechanism and a tire cross-section in accordance with some embodiments of the present invention.

In accordance with the present invention, FIG. 1 and FIG. 2 illustrate a wheel 30 for a vehicle such as an automobile includes a body 31 having an outer peripheral rim 32 on which a tire 33 is mounted. An annular inflation region 34 is defined inside the tire 33 by the inner wall of the tire 33 and the rim 32. A single self-pressure regulator tire 10 embodying the invention maybe mounted externally on the rim 32 or in another option, as an add-on device. In both mounting options, self-pressure regulator tire 10 pumps and/or regulates air from the atmosphere into the annular inflation region 34.

A single self-pressure regulator tire 10 is illustrated as being mounted on the rim 32. However, an additional element and/or elements maybe mounted at an opposed position on the rim 32 to provide counterbalance as to the single self-pressure regulator tire 10.

Figure 3:
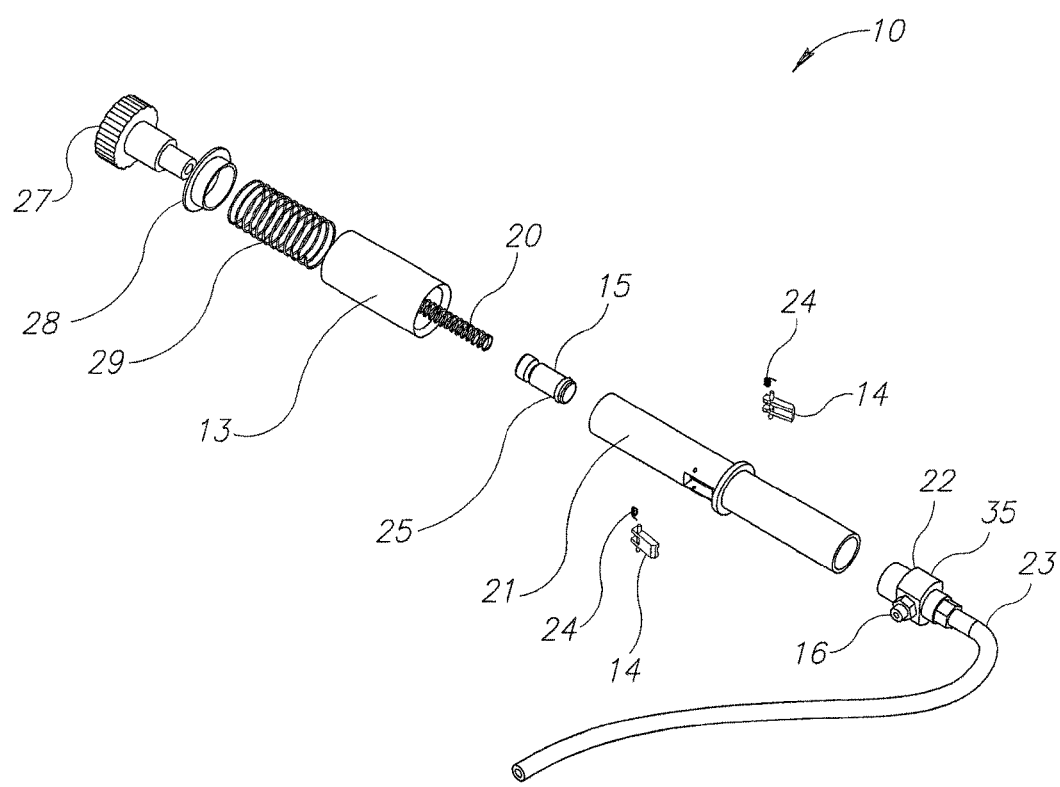
FIG. 3 is an assembly view of a self-pressure regulator tire mechanism in accordance with some embodiments of the present invention.

A schematic diagram of self-pressure regulator tire 10 is illustrated in FIG. 3. An air pipe 23 is connected to the tire 33 inflation region 34 providing it with thrust air from the atmosphere. For an add-on mounting option of self-pressure regulator tire 10 the air pipe 23 is connected via the tire 33 valve. For an integral mounting option of self-pressure regulator tire 10 (i.e. self-pressure regulator tire 10 maybe located as part of the rim 32) no air pipe 23 is required.

A bottom cover 22 includes a connection to the air pipe 23 (if applicable) and a one-way air in valve 16. Air from the atmosphere is sucked/drawn via the one-way air valve 16. In addition, one-way air release valve 35 has the role of releasing thrust air (to the atmosphere or to a storage chamber not illustrated) once tire inflation region 34 pressure is equal or above the desired pressure produced by self-pressure regulator tire 10.

On the outer part of a housing 21 of the device (referred hereinafter a "the main sleeve" or simply "sleeve") at least a single locking element 14 comprising of at least a single torsion spring 24 are connected. A piston 15 may move freely in this main sleeve 21. An air chamber is created between the sealing ring 25 (or any other means of sealing between the piston 15 and the main sleeve 21) on the piston 15 through the inner volume of the bottom cover 22 to the tire 33 valve. Torsion spring 24 has the role of pushing locking element 14 perpendicular as to main sleeve 21. As long as external piston 13 is up (i.e. not covering locking element 14) torsion spring 24 is in locked condition (default situation).

Spring 20 has the role of converting the centrifugal force (due to wheel 30 rotation) and work (due to the displacement of the piston 15) into potential energy which is then converted into kinetic work by releasing the piston 15 from stopper mechanism (locking elements 14).

External piston 13 may move radially outward (i.e. in direction of calibration screw 27) by centrifugal force to enable locking elements 14 a free move. External spring 29 has the role of retrieving external piston 13 inward (i.e. in direction of bottom cover 22) once vehicle speed has reduced its speed less than a certain speed (velocity threshold VTHRESHOLD). As external piston 13 passes (due to external spring 29 potential energy) locking elements 14; piston 15 is released from stopper mechanism (locking elements 14) and thrust pressurized air. A top ring 28 is located in the upper side of self-pressure regulator tire 10 preventing external spring 29 to pop out.

A calibration mechanism in the self-pressure regulator tire 10 provides a method of adjusting the preferred/desired pressure of the inflation region 34. This calibration mechanism may be implemented by a calibration screw 27. Spring 20 span (free movement) which is directly related to the inflation pressure provided by self-pressure regulator tire 10 is adjusted via calibration screw 27. Self-pressure regulator tire 10 provides; lower pressure inflation while calibration screw 27 is outward as to higher pressure inflation while calibration screw 27 is inward (i.e. in direction of bottom cover 22).

Figure 4:
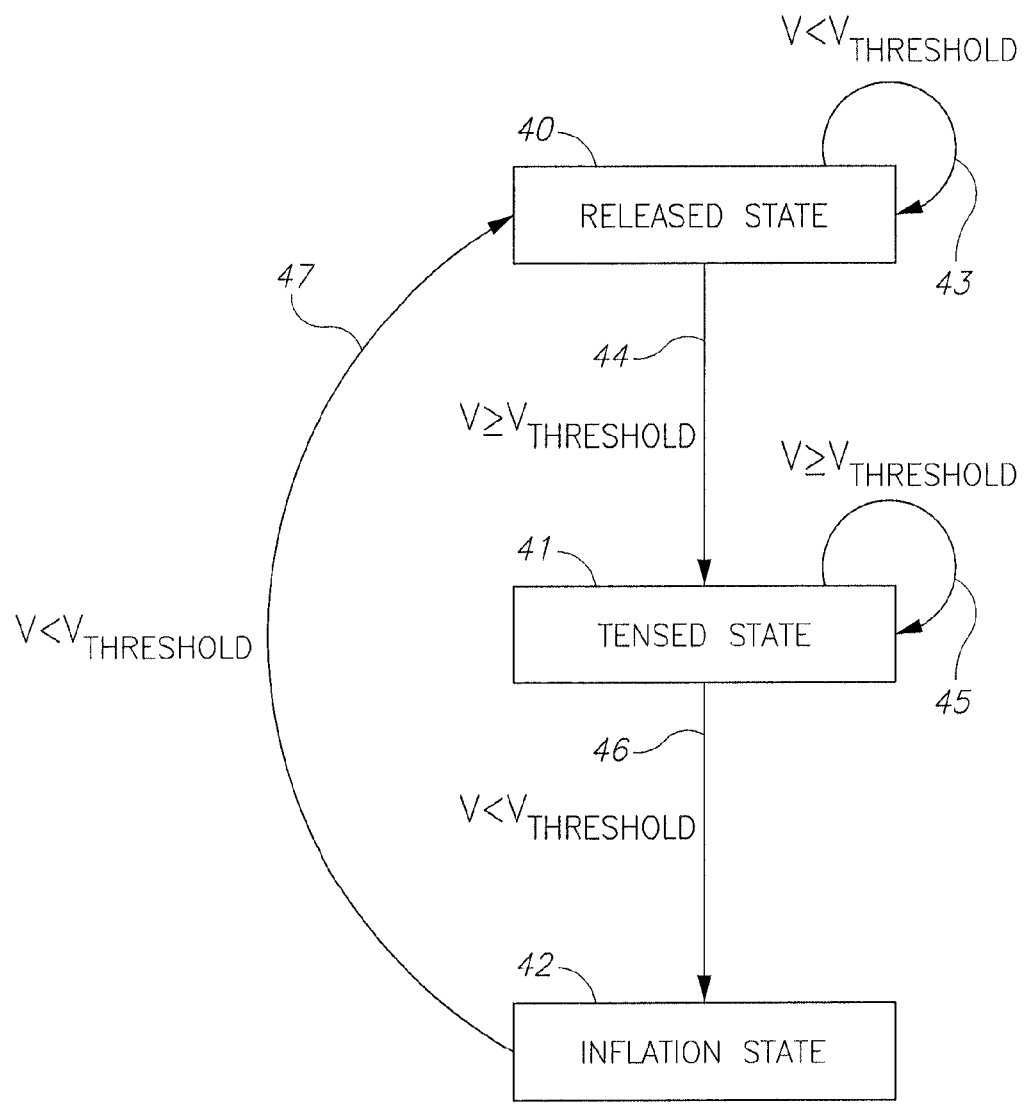
FIG. 4 describes a flow chart of an embodiment of the self-pressure regulator tire mechanism in accordance with some embodiments of the present invention.

FIG. 4 illustrates a flow chart of a self-pressure regulator tire mechanism 10. In released state 40, main piston 15 is not locked by stopper mechanism (locking elements 14) which is directly related to vehicle velocity (i.e. tire radial speed). Main piston 15 cannot reach stopper mechanism (locking elements 14) due to the low centrifugal force which does not overcome the main piston 15 spring 20 constant force. A threshold is set which is defined as a certain vehicle speed (velocity threshold VTHRESHOLD for example VTHRESHOLD=40 km per hour) in which the piston 15 spring 20 constant force is similar to the centrifugal force (neglecting tension losses for simplicity reasons).

As long as the vehicle speed is lower than velocity threshold (V<VTHRESHOLD for example VTHRESHOLD=40 km per hour and V=30 km per hour) self-pressure regulator tire mechanism 10 shall remain 43 in released state 40.

Once the vehicle speed is above velocity threshold (V≥VTHRESHOLD for example VTHRESHOLD=40 km per hour and V=45 km per hour) self-pressure regulator tire mechanism 10 shall transit 44 to tensed state 41. In tensed state 41, main piston 15 is locked by stopper mechanism (locking elements 14) which is directly related to vehicle velocity (i.e. tire radial speed). External piston 13 has passed stopper mechanism (locking elements 14) due to the high centrifugal force which overcomes the external piston 13 spring 29 constant force. In addition, main piston 15 has passed stopper mechanism (locking elements 14) due to the high centrifugal force which overcomes the main piston 15 spring 20 constant force.

As long as the vehicle speed is above than velocity threshold (V≥VTHRESHOLD for example VTHRESH- OLD=40 km per hour and V=50 km per hour) self-pressure regulator tire mechanism 10 shall remain 45 in tensed state 41.

Once the vehicle speed has been reduced below velocity threshold (V<VTHRESHOLD for example VTHRESHOLD=40 km per hour and V=38 km per hour) self-pressure regulator tire mechanism 10 shall transit 46 to inflation state 42. In inflation state 42, external spring 29 potential energy overcomes centrifugal force; pushing external piston 13 inward (i.e. in direction of bottom cover 22) and releasing stopper mechanism (locking elements 14). In addition, main piston 15 is released from stopper mechanism (locking elements 14). Upon release, main piston 15 overcomes the current centrifugal force which is lower than the potential energy of main piston 15 spring 20. Air is being thrust from the pressure chamber of main sleeve 21 via bottom cover 22, air pipe (if applicable) to the tire 33 valve.

After inflation state 42 (vehicle speed is below velocity threshold V<VTHRESHOLD) self-pressure regulator tire 10 returns 47 to released state 40.

In case inflation region 34 pressure is equal or higher than desired self-pressure regulator tire 10 inflation pressure the thrust air is released via release valve 35 (to the atmosphere or to a storage chamber not illustrated).

Figure 5A:
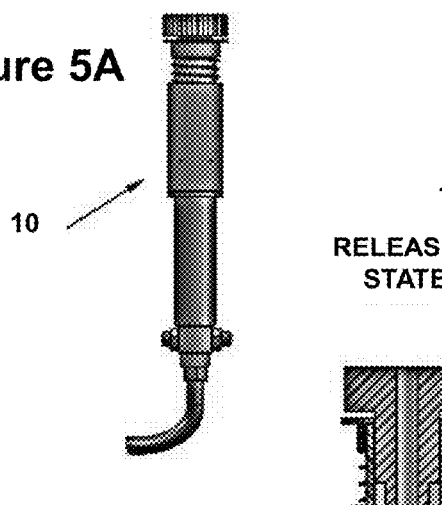
FIGS. 5A, 5B and 5C are views of a self-pressure regulator tire mechanism in a released state in accordance with some embodiments of the present invention.
Figure 5B:
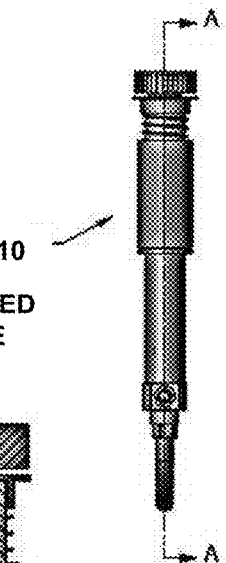
Figure 5C:
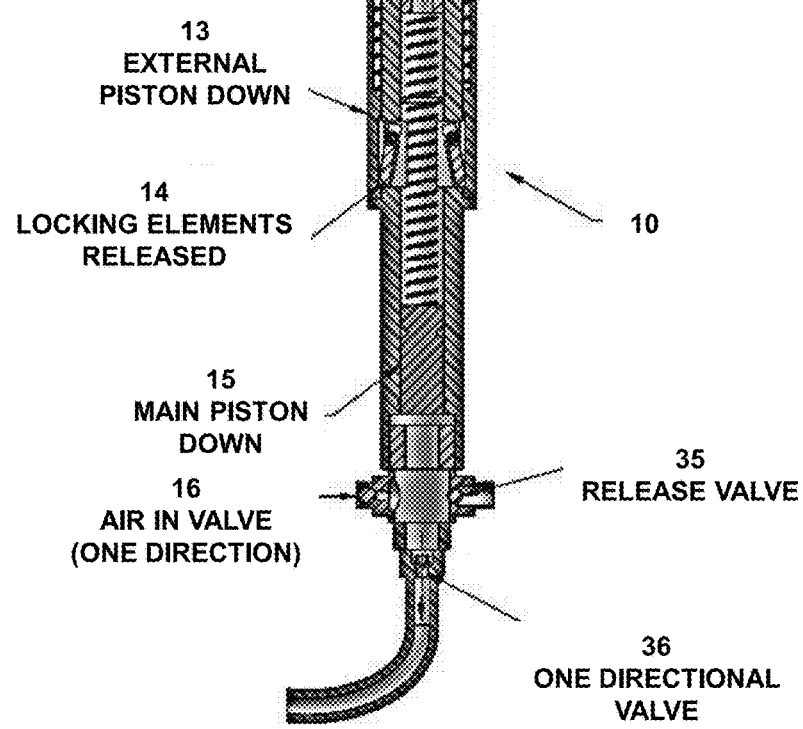

FIGS. 5A, 5B and 5C are views of a self-pressure regulator tire mechanism 10 in a released state 40. Main piston 15 is down (i.e. closer to bottom cover 22 as to calibration screw 27) and external piston 13 is also down, covering stopper mechanism (locking elements 14). A one direction valve 36 maybe introduced to self-pressure regulator tire mechanism 10 which has the role of preventing tire pressure in the inflation region 34 to leak out via the mechanism.

FIGS. 6A, 6B and 6C are views of a self-pressure regulator tire mechanism 10 in a tensed state 41. Main piston 15 is up (i.e. closer to calibration screw 27 as to bottom cover 22) and external piston 13 is also up, uncovering stopper mechanism (locking elements 14). In addition, main piston 15 is locked by stopper mechanism (locking elements 14).

Figure 7:
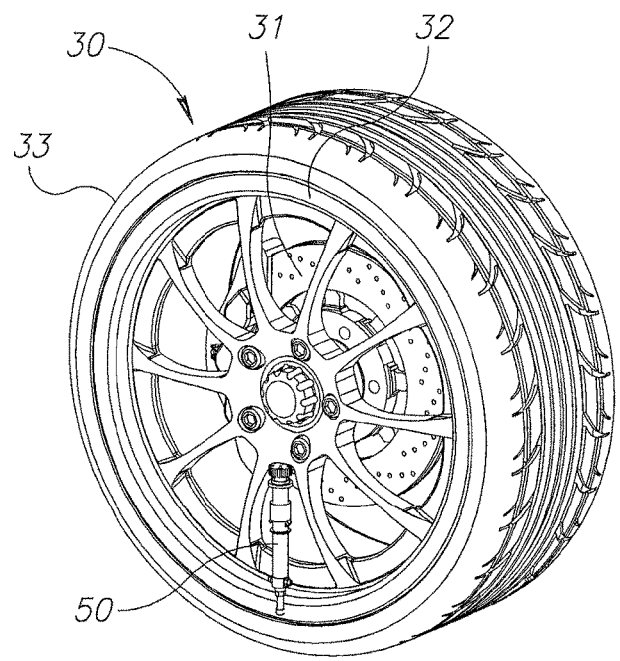
FIG. 7 is a view of an invert self-pressure regulator tire mechanism and a tire in accordance with some embodiments of the present invention.
Figure 8:
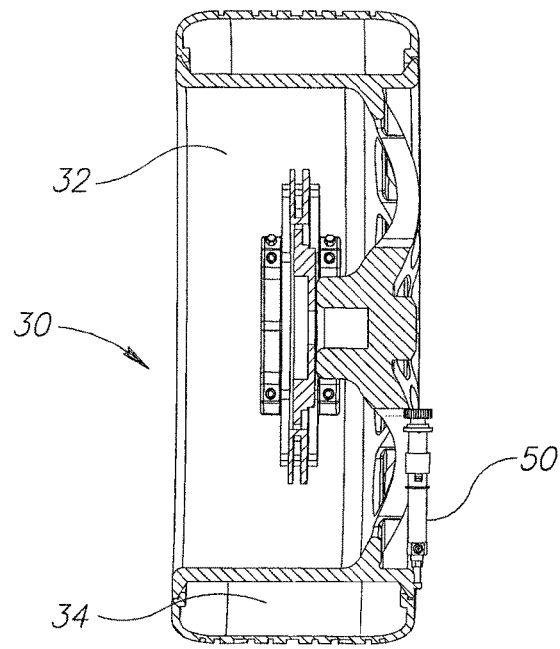
FIG. 8 is a view of an invert self-pressure regulator tire mechanism and a tire cross-section in accordance with some embodiments of the present invention.

In accordance with the present invention, FIG. 7 and FIG. 8 illustrate a wheel 30 for a vehicle such as an automobile includes a body 31 having an outer peripheral rim 32 on which a tire 33 is mounted. An annular inflation region 34 is defined inside the tire 33 by the inner wall of the tire 33 and the rim 32. A single invert self-pressure regulator tire 50 embodying the invention maybe mounted externally on the rim 32 or in another option, as an add-on device. In both mounting options, invert self-pressure regulator tire 50 pumps and/or regulates air from the atmosphere into the annular inflation region 34.

A single invert self-pressure regulator tire 50 is illustrated as being mounted on the rim 32. However, an additional element and/or elements maybe mounted at an opposed position on the rim 32 to provide counterbalance as to the single invert self-pressure regulator tire 50.

Figure 9:
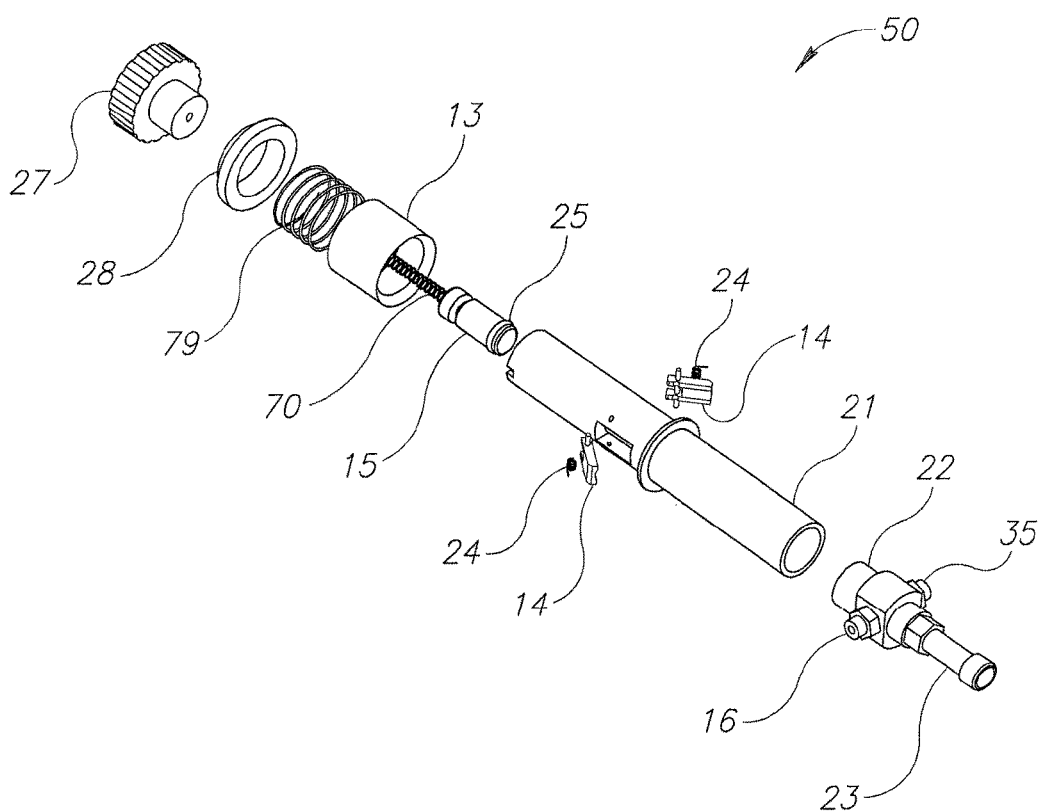
FIG. 9 is an assembly view of an invert self-pressure regulator tire mechanism in accordance with some embodiments of the present invention.

A schematic diagram of invert self-pressure regulator tire 50 is illustrated in FIG. 9. An air pipe 23 is connected to the tire 33 inflation region 34 providing it with thrust air from the atmosphere. For an add-on mounting option of invert self-pressure regulator tire 50 the air pipe 23 is connected via the tire 33 valve. For an integral mounting option of invert self-pressure regulator tire 50 (i.e. invert self-pressure regulator tire 50 maybe located as part of the rim 32) no air pipe 23 is required.

A bottom cover 22 includes a connection to the air pipe 23 (if applicable) and a one-way air in valve 16. Air from the atmosphere is sucked/drawn via the one-way air valve 16. In addition, one-way air release valve 35 has the role of releasing thrust air (to the atmosphere or to a storage chamber not illustrated) once tire inflation region 34 pressure is equal or above the desired pressure produced by invert self-pressure regulator tire 50.

On the outer part of the main sleeve 21 at least a single locking element 14 comprising of at least a single torsion spring 24 are connected. A piston 15 may move freely in this main sleeve 21. An air chamber is created between the sealing ring 25 (or any other means of sealing between the piston 15 and the main sleeve 21) on the piston 15 through the inner volume of the bottom cover 22 to the tire 33 valve. Torsion spring 24 has the role of pushing locking element 14 perpendicular as to main sleeve 21. As long as external piston 13 is up (i.e. not covering locking element 14) torsion spring 24 is in locked condition (default situation).

Extension spring 70 has a role of pulling and returning the inner piston 15 from the bottom of the main sleeve 21 upwards (to the center of the wheel) to the locking elements 14 in low velocity (when the centrifugal force is negligible).

External piston 13 may move radially outward (i.e. in direction of bottom cover 22) by centrifugal force to enable locking elements 14 a free move. External extension spring 79 has the role of retrieving external piston 13 inward (i.e. in direction of calibration screw 27) once vehicle speed has reduced its speed less than a certain speed (velocity threshold VTHRESHOLD). As external piston 13 passes (due to external extension spring 79 potential energy) locking elements 14; piston 15 is released from stopper mechanism (locking elements 14) and thrust pressurized air. A top ring 28 is located in the upper side of invert self-pressure regulator tire 50 preventing external extension spring 79 to pop out.

A calibration mechanism in the invert self-pressure regulator tire 50 provides a method of adjusting the preferred/desired pressure of the inflation region 34. This calibration mechanism may be implemented by a calibration screw 27. Extension spring 70 span (free movement) which is directly related to the inflation pressure provided by invert self-pressure regulator tire 50 is adjusted via calibration screw 27. Invert self-pressure regulator tire 50 provides; lower pressure inflation while calibration screw 27 is outward as to higher pressure inflation while calibration screw 27 is inward (i.e. in direction of bottom cover 22).

Figure 10:
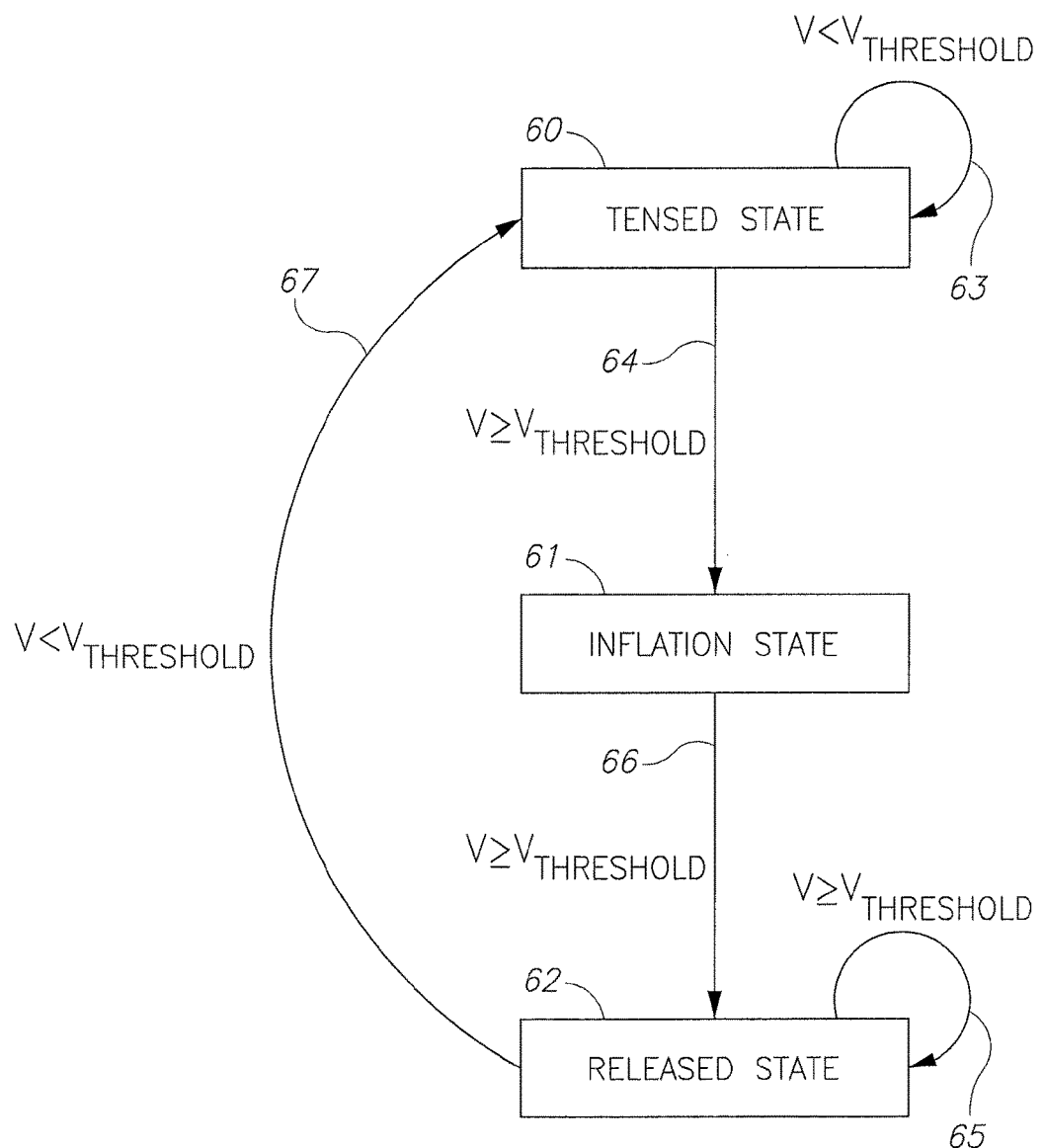
FIG. 10 describes a flow chart of an invert embodiment of the self-pressure regulator tire mechanism in accordance with some embodiments of the present invention.
Figure 13:
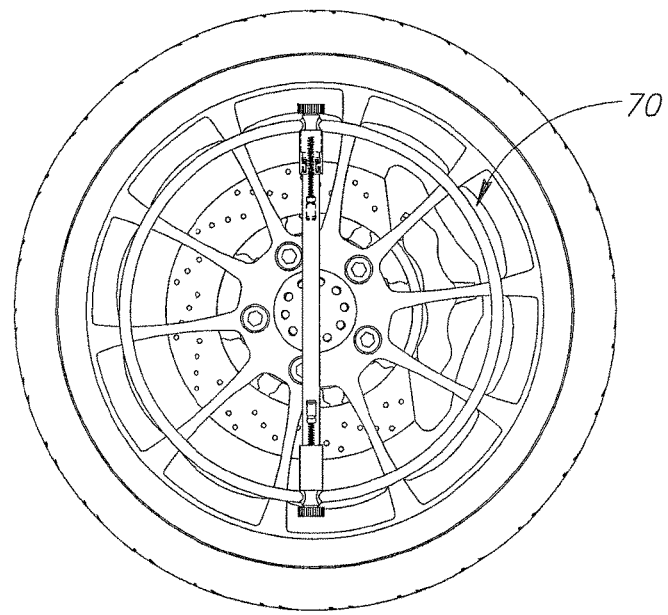
FIG. 13-FIG. 15 are a view of two invert self-pressure regulator tire mechanism and a tire in accordance with some embodiments of the present invention.
Figure 14:
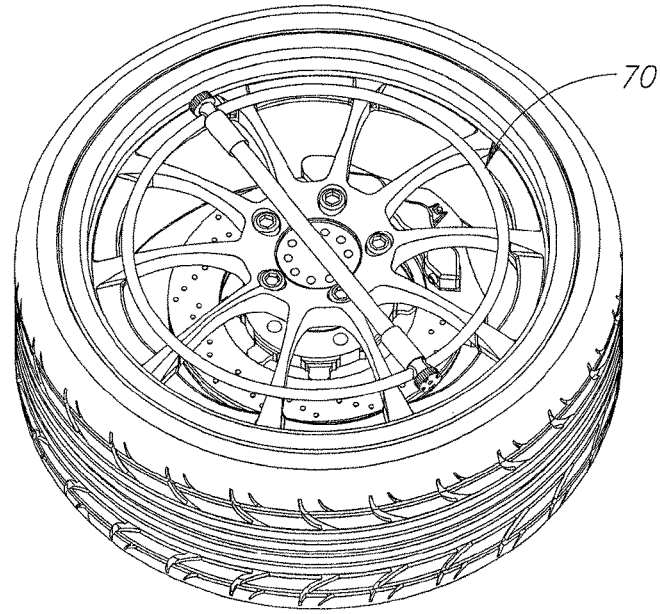
Figure 15:
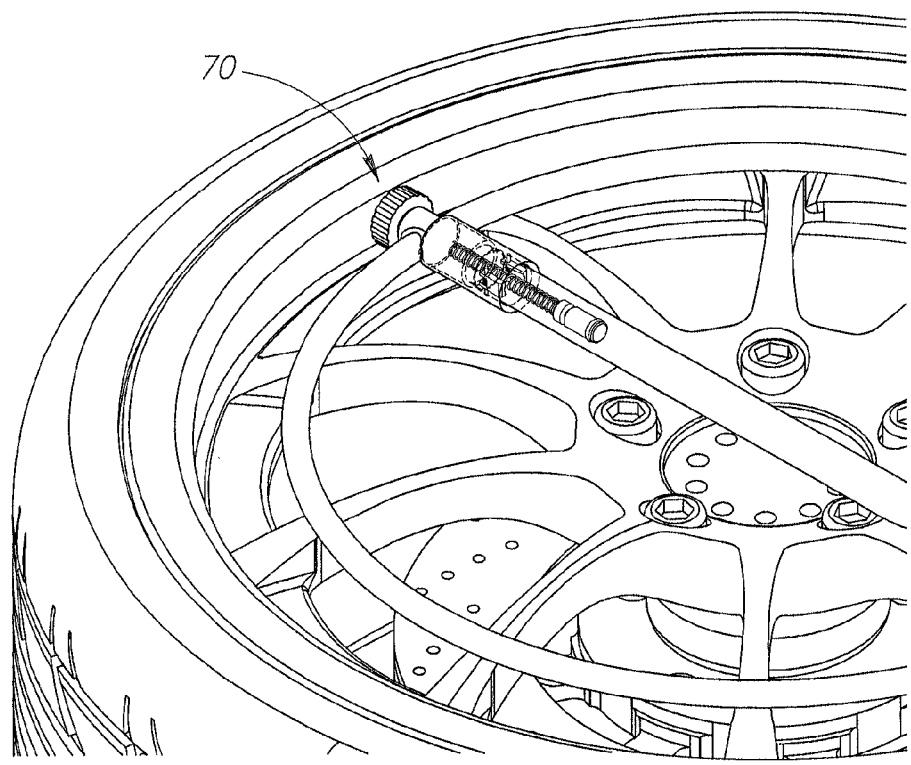

FIG. 10 illustrates a flow chart of an invert self-pressure regulator tire mechanism 50. In released state 62, main piston 15 is not locked by stopper mechanism (locking elements 14) which is directly related to vehicle velocity (i.e. tire radial speed). Main piston 15 cannot reach stopper mechanism (locking elements 14) due to the high centrifugal force which overcomes the main piston 15 extension spring 70 constant force. A threshold is set which is defined as a certain vehicle speed (velocity threshold VTHRESHOLD for example VTHRESHOLD=40 km per hour) in which the piston 15 extension spring 70 constant force is similar to the centrifugal force (neglecting tension losses for simplicity reasons).

As long as the vehicle speed is equal or above velocity threshold (V≥VTHRESHOLD for example VTHRESHOLD=40 km per hour and V=45 km per hour) invert self-pressure regulator tire mechanism 50 shall remain 65 in released state 62.

Once the vehicle speed is lower than velocity threshold (V<VTHRESHOLD for example VTHRESHOLD=40 km per hour and V=35 km per hour) invert self-pressure regulator tire mechanism 50 shall transit 67 to tensed state 60. In tensed state 60, main piston 15 is locked by stopper mechanism (locking elements 14). External piston 13 has passed stopper mechanism (locking elements 14) due to the low centrifugal force which does not overcome the external piston 13 extension spring 79 constant force. In addition, main piston 15 has passed stopper mechanism (locking elements 14) due to the low centrifugal force which does not overcome the main piston 15 extension spring 70 constant force.

As long as the vehicle speed is lower than velocity threshold (V<VTHRESHOLD for example VTHRESHOLD=40 km per hour and V=20 km per hour) invert self-pressure regulator tire mechanism 50 shall remain 63 in tensed state 60.

Once the vehicle speed is above velocity threshold (V≥VTHRESHOLD for example VTHRESHOLD=40 km per hour and V=42 km per hour) invert self-pressure regulator tire mechanism 50 shall transit 64 to inflation state 61. In inflation state 61, external spring 29 potential energy does not overcome centrifugal force; pushing external piston 13 inward (i.e. in direction of bottom cover 22) and releasing stopper mechanism (locking elements 14). In addition, main piston 15 is released from stopper mechanism (locking elements 14). Upon release, main piston 15 overcomes the current centrifugal force which is lower than the potential energy of main piston 15 extension spring 70. Air is being thrust from the pressure chamber of main sleeve 21 via bottom cover 22, air pipe (if applicable) to the tire 33 valve.

After inflation state 61 (vehicle speed is equal or above velocity threshold V≥VTHRESHOLD) invert self-pressure regulator tire 50 returns 66 to released state 62.

In case inflation region 34 pressure is equal or higher than desired invert self-pressure regulator tire 50 inflation pressure the thrust air is released via release valve 35 (to the atmosphere or to a storage chamber not illustrated).

FIGS. 11A, 11B and 11C are views of an invert self-pressure regulator tire mechanism 50 in a released state 60. Main piston 15 is down (i.e. closer to bottom cover 22 as to calibration screw 27) and external piston 13 is also down, covering stopper mechanism (locking elements 14). A one direction valve 36 maybe introduced to self-pressure regulator tire mechanism 10 which has the role of preventing tire pressure in the inflation region 34 to leak out via the mechanism.

FIGS. 12A, 12B and 12C are views of an invert self-pressure regulator tire mechanism 50 in a tensed state 60. Main piston 15 is up (i.e. closer to calibration screw 27 as to bottom cover 22) and external piston 13 is also up, uncovering stopper mechanism (locking elements 14). In addition, main piston 15 is locked by stopper mechanism (locking elements 14).

In accordance with the present invention, FIG. 12-FIG. 15 illustrate a wheel for a vehicle with two invert self-pressure regulator tire 70 embodying the invention. Invert self-pressure regulator tire 70 has a similar mechanism as invert self-pressure regulator tire 50 except pressured air is located in the radial sleeve.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. An apparatus for regulating an air pressure level in a tire comprising:
    a housing to be coupled to said tire;
    an internal piston located within said housing, wherein the housing allows the internal piston to move substantially along a radius of said tire;
    an internal spring located within said housing to apply a force to said internal piston;
    a one-way valve; and
    locking elements located at a specified location along said housing, and mechanically controlled by an external piston connected to an external spring which is concentric with respect to the internal spring,
    wherein said internal piston is configured to move towards a first end of the housing responsive to an imbalance between centrifugal force applied to the internal piston due to angular speed of the tire and force applied thereto by the internal spring,
    wherein the locking elements are configured to lock the internal piston at said specified location whenever said tire reaches a predefined angular speed,
    wherein the locking elements are further configured to release the internal piston once the angular speed of the tire crosses a predefined threshold, so that said internal piston moves towards a second end of the housing and produces an air pulse, and
    wherein the one way valve is configured to convey the air pulse into the tire as long as the air pressure level of the tire is below a predefined target air pressure level.

2. The apparatus according to claim 1, wherein the air pulse is created when the angular speed is reduced below a predefined threshold.

3. The apparatus according to claim 1, wherein the air pulse is created when the angular speed is increased above a predefined threshold.

4. The apparatus according to claim 1, wherein the one-way valve is further configured to release the air pulse back to ambiance, whenever the air pressure level of the tire is equal to or above a predefined target air pressure level.

5. The apparatus according to claim 1, further comprising a screw associated with the external spring and configured to determine a K constant of the external spring, and wherein setting the K constant affects the target air pressure level of the tire.

6. The apparatus according to claim 1, wherein the housing is equal to or shorter than a radius of the tire.

7. The apparatus according to claim 1, wherein a volume of the internal piston is at least 100 times smaller than the volume of the tire.

8. The apparatus according to claim 1, further comprising a tube connecting the housing with a valve of said tire.

* * * * *